United States Patent [19]

Sakamoto et al.

[11] 4,436,981

[45] Mar. 13, 1984

[54] VERTICAL DOWN WELDING PROCESS BY GRAVITY ARC WELDING AND WELDING MACHINE THEREFOR

[75] Inventors: Noboru Sakamoto; Itaru Yamashita; Satoshi Wada; Kenichi Yano; Suehiro Oda, all of Chiba, Japan

[73] Assignee: Kawasaki Steel Corporation, Kobe, Japan

[21] Appl. No.: 346,074

[22] PCT Filed: Jun. 2, 1981

[86] PCT No.: PCT/JP81/00123
§ 371 Date: Jan. 29, 1982
§ 102(e) Date: Jan. 29, 1982

[87] PCT Pub. No.: WO81/03453
PCT Pub. Date: Dec. 10, 1981

[30] Foreign Application Priority Data

| Jun. 2, 1980 | [JP] | Japan | 55-74092 |
| Jun. 25, 1980 | [JP] | Japan | 55-88130[U] |
| Jun. 25, 1980 | [JP] | Japan | 55-88131[U] |

[51] Int. Cl.³ .............................................. B23K 9/12
[52] U.S. Cl. .................................. 219/124.32; 219/126
[58] Field of Search ................. 219/125.1, 126, 137.43, 219/124.32

[56] References Cited

U.S. PATENT DOCUMENTS

2,536,999  1/1951  Skytte .............................. 219/124.32

FOREIGN PATENT DOCUMENTS

45-23302  9/1970  Japan .
50-35062  10/1975  Japan .
52-45559  4/1977  Japan .............................. 219/124.32

OTHER PUBLICATIONS

"A Deck Welder," *Electrical Review,* (Mar. 1943), p. 360.

*Primary Examiner*—B. A. Reynolds
*Assistant Examiner*—C. M. Sigoa
*Attorney, Agent, or Firm*—Sughrue, Mion, Zinn, Macpeak, and Seas

[57] ABSTRACT

A vertical down welding process by gravity arc welding, in which a guide rail 5a is disposed aslant upwardly at an inclination angle $\theta_1$ of 40° to 60° to a vertical weld line 3 and, while a holder 6 of a welding rod 4 is brought down along the guide rail 5a, the welding rod 4 is moved down along the vertical weld line 3 for welding.

A welding machine for use with this vertical down welding process is constructed so that the upwardly inclined guide rail 5a is provided at the inclination angle $\theta_1$ of 40° to 60°;, the guide rail 5a is comprised of a main rail 5c and a sub-rail 5b; and the holder 6 of the welding rod 4 is lowered from the sub-rail 5b to the mail rail 5c.

2 Claims, 8 Drawing Figures

VERTICAL DOWN WELDING PROCESS BY GRAVITY ARC WELDING AND WELDING MACHINE THEREFOR

TECHNICAL FIELD

The present invention relates to a vertical down welding process by gravity arc welding and a welding machine therefor. In particular it relates to a vertical down welding process which permits semi-automatic welding along a vertical weld line by maintaining the manipulation-of-electrode ratio substantially constant and minimizing the occurrence of spattering through effective utilization of gravity during movement of a coated electrode by the counterweight thereof. The invention is a vertical down welding machine therefor which is small, lightweight, excellent in portability and is able to perform welding while retaining a welding rod at an appropriate position with respect to the vertical weld line throughout the welding operation.

BACKGROUND TECHNIQUES

Heretofore there have been known the following semi-automatic welding processes using a coated electrode (hereinafter referred to simply as a welding rod). However, they have both merits and demerits; in general, they are poor in welding ability and introduce bulkiness in welding machines. Hence none of the conventional processes are satisfactory in these points.

(1) Gravity Arc Welding

This welding process is one that performs welding while moving the welding rod along a horizontal weld line by lowering a holder of the welding rod along an inclined slide bar. This welding process is advantageous in that the manipulation-of-electrode ratio (=the length of weld bead formed in a unit time/the length of the welding rod molten in the unit time) is constant, but this process requires the lengthening of the slide bar corresponding to the length of the weld line, which makes the welding machine bulky and loses its portability, resulting in the process becoming poor in workability.

(2) Inclination Welding with Electrode Set of Lower Angle

This welding process is one that performs welding while moving the welding rod along the horizontal weld line by rotating the welding rod holder after setting the welding rod at an angle of 10° to 12° to the horizontal weld line. This welding process does not involve the use of the slide bar, and hence it can achieve the reduction of the size and weight of the welding machine, but as the mnipulation-of-electrode ratio varies in a moment and does not stay constant, the bead width does not become fixed. Since the initial setting angle of the welding rod is as small as 10° to 12°, the arc length becomes large to cause a disorder of arc. This introduces the possibilities of spatter occurring and undercuts being formed, thus resulting in lowered welding ability of the process.

For the solution of the abovesaid defects of such prior art welding processes and welding machines therefor, the present inventions have previously proposed a gravity arc welding process in which the angle between the welding rod and the weld line is initially set small and changed after starting the welding and then held constant, and a welding machine for use in this process as set forth in Japanese Pat. Pub. No. 8864/76 gazette.

But this welding process and the welding machine therefor were developed for the application to horizontal fillet welding, so they are difficult of application to vertical down welding.

That is to say, according to this welding process, the welding rod holder is first rotated to a predetermined position and then lowered by gravity along an inclined guide rail and, in this while, the welding rod moves along a horizontal weld line to perform horizontal fillet welding semi-automatically. The manipulation-of-electrode ratio can be held constant or substantially constant. Since this welding process is intended primarily for the horizontal fillet welding, however, when applying this process to the vertical down welding, it is difficult to hold the guide rail in a vertical position and the welding rod goes down along the weld line, so that spatters violently scatter from that welding position over a wide range to aggravate the welding environment. Especially, the spatters contaminate the guide rail, stopping the sliding movement of the welding rod holder or bringing trouble on the sliding movement thereof.

Further, the welding machine previously proposed by the present inventors has been made small and lightweight by shortening the guide rail, but as the provision of the guide rail is a requisite, it is difficult to support the guide rail in the vertical position and since a support mechanism suitable for such a purpose has not been developed, this welding machine cannot be applied to the vertical down welding.

The present invention has for its object to settle the aforementioned defects and, specifically, it is to propose a vertical down welding process and a welding machine therefor which employ a support base which is able to firmly and surely support the guide rail at the lower end thereof during vertical down welding, small and lightweight, easily detachable and easy to carry.

Furthermore, the present invention relates to a vertical down welding machine which is provided with a very simple-structured positioning device that is capable of properly holding the relative positions of the welding rod and the vertical down weld line, ensuring excellent welding ability of the welding machine.

DISCLOSURE OF THE INVENTION

Briefly stated, the welding process of the present invention is characterized in that the guide rail is provided obliquely aslant at an angle of 40° to 60° to the vertical weld line; the welding rod holder is lowered by gravity along the guide rail; in this while, the welding rod is brought down to a predetermined position while successively changing the angle between the welding rod and the vertical weld line that was initially set to a predetermined starting value; and, thereafter, the welding rod is further brought down while maintaining the angle between the welding rod and the vertical weld line substantially constant, thus performing welding.

Accordingly, welding can automatically be carried out in the vertical position along the weld line while the welding rod holder moves down along the guide rail and the angle between the welding rod and the vertical weld line starts with a small value and gradually increases and, after having reached a predetermined value, the angle is held unchanged; therefore, the guide rail need not be long.

Moreover, the welding process of the present invention is characterized in that a weld angle is initially set to a starting value of 20° or more; the welding rod is brought down to a predetermined position while successively varying the angle between the welding rod and the vertical weld line; and then the welding rod is further brought down while holding the angle between the welding rod and the vertical weld line constant in the range of 35° to 80°, thereby performing the welding operation.

Therefore, even if the welding starts with a small angle between the welding rod and the vertical weld line, since the weld angle is 20° or more, a sufficient peneration is imparted to the root portion of the weld line. After welding has proceeded to a predetermined position, the angle between the welding rod and the vertical weld line is retained constant in the range of 35° to 80°, ensuring that the manipulation-of-electrode ratio is held constant.

In addition the welding machine of the present invention is characterized in that the guide rail for guiding down in its lengthwise direction the welding rod holder by the counterweight thereof is constituted by a main rail and a sub-rail; the guide rail is disposed aslant upwardly with respect to the vertical weld line; the sub-rail is disposed at the upper end of the guide rail; the main rail is formed straight; and the sub-rail is disposed not to be in alignment with the main rail.

Accordingly, on the sub-rail of the guide rail, the welding rod holder permits welding by the welding rod while successively varying the angle between the welding rod and the vertical weld line and when the welding rod holder has proceeded to the main rail, the angle between the welding rod and the vertical weld line can be held constant.

BEST MODES FOR PUTTING THE INVENTION INTO PRACTICE

Figure 1:
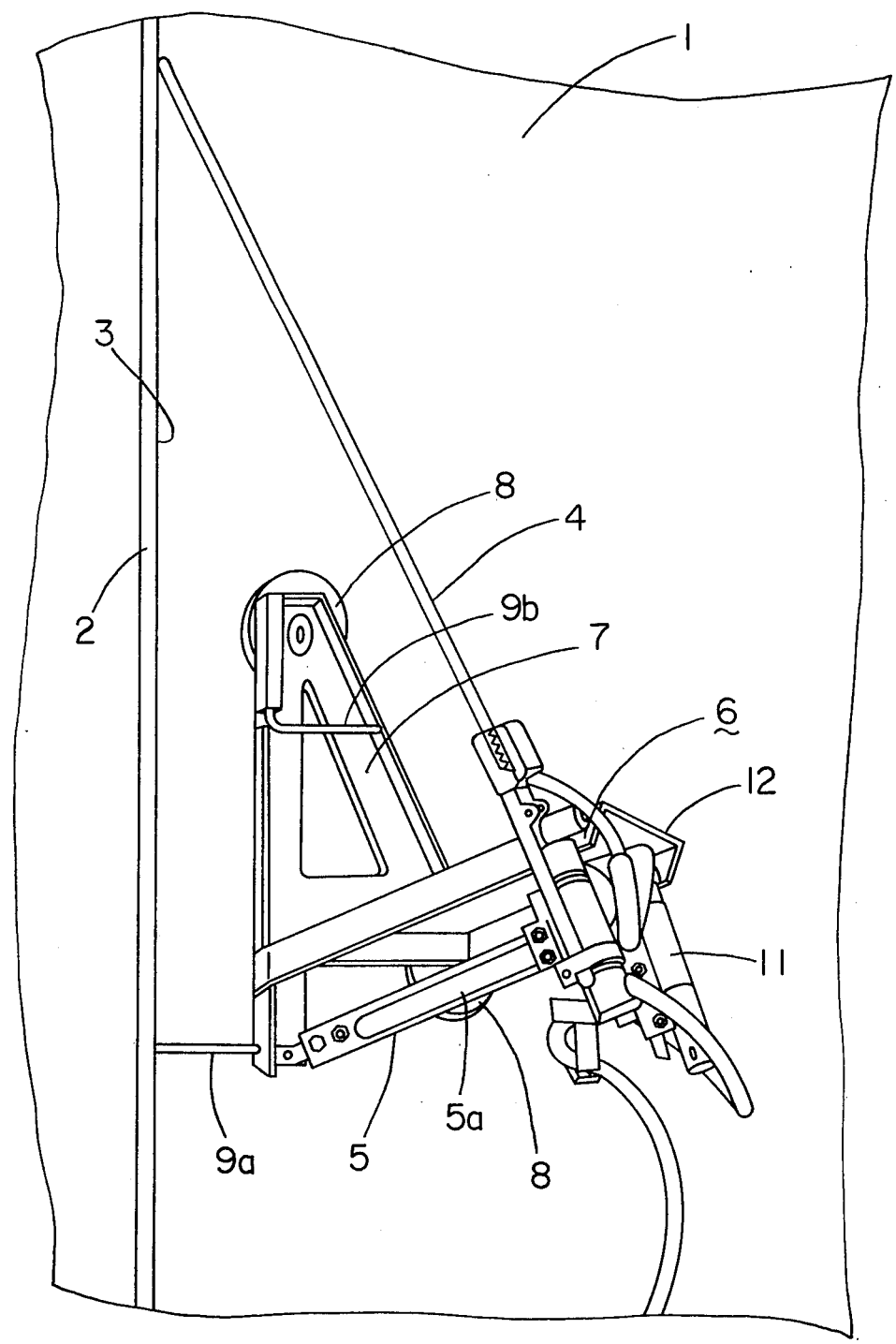
FIG. 1 is a diagram of an example of the welding machine embodying this invention process, explanatory of its verticl down welding operation.
Figure 2:
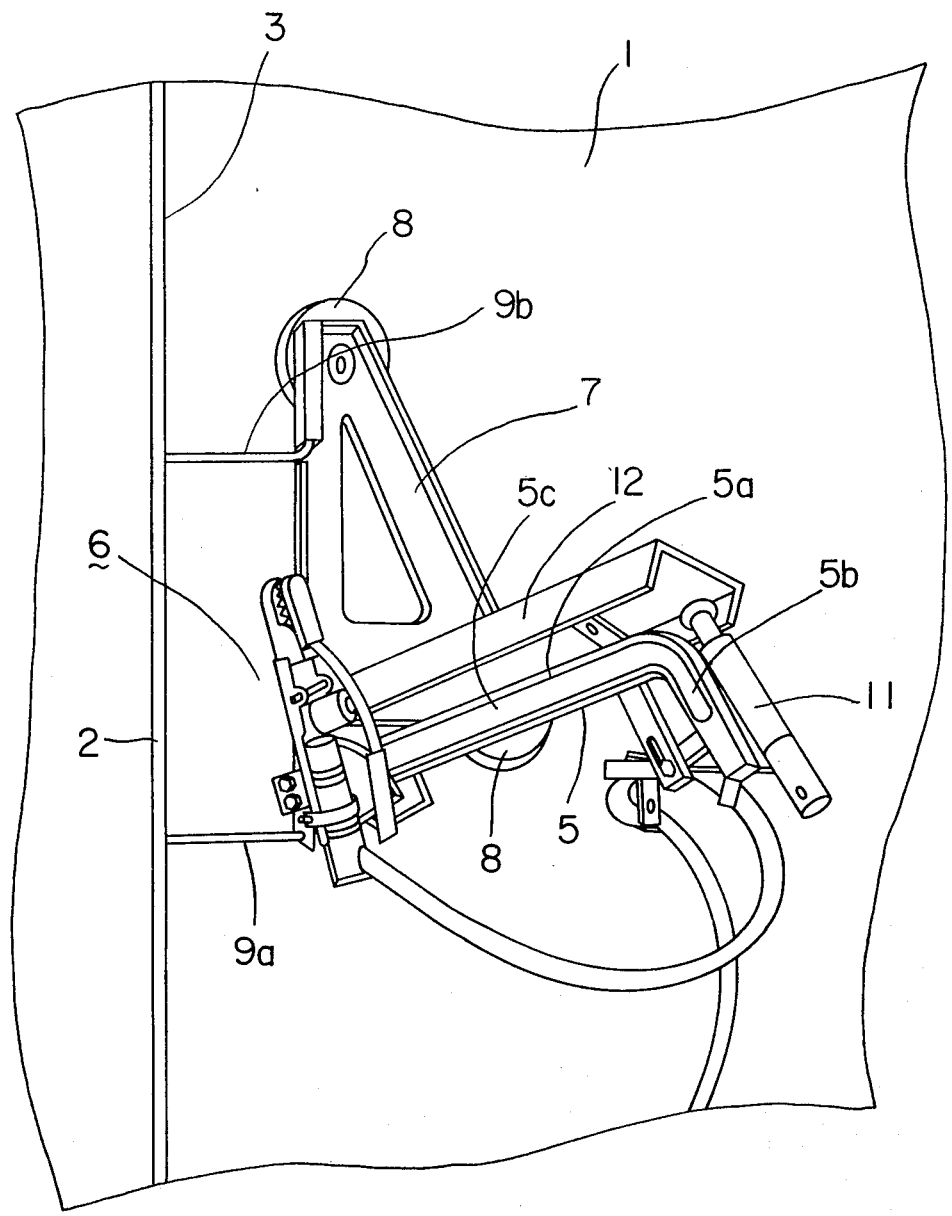
FIG. 2 is a perspective view of the welding machine.

In FIGS. 1 and 2, reference numerals 1 and 2 indicate members to be welded, which are disposed perpendicularly to to each other and joined together in a T-letter form. A weld line 3 is formed between the members 1 and 2. The weld line 3 is held in a vertical position and a welding rod 4 is moved down. That is to say, welding is performed by moving down the welding rod 4 along the weld line 3 held in the vertical position. For the downward movement of the welding rod 4, guide rail 5a is disposed aslant upwardly with respect to the weld line 3. The guide rail 5a is usually formed in the surface or a side surface of a slide bar 5. The slide bar 5 is disposed aslant to extend upwardly at an inclination angle $\theta_1$ ranging from 40° to 60°.

Figure 3A:
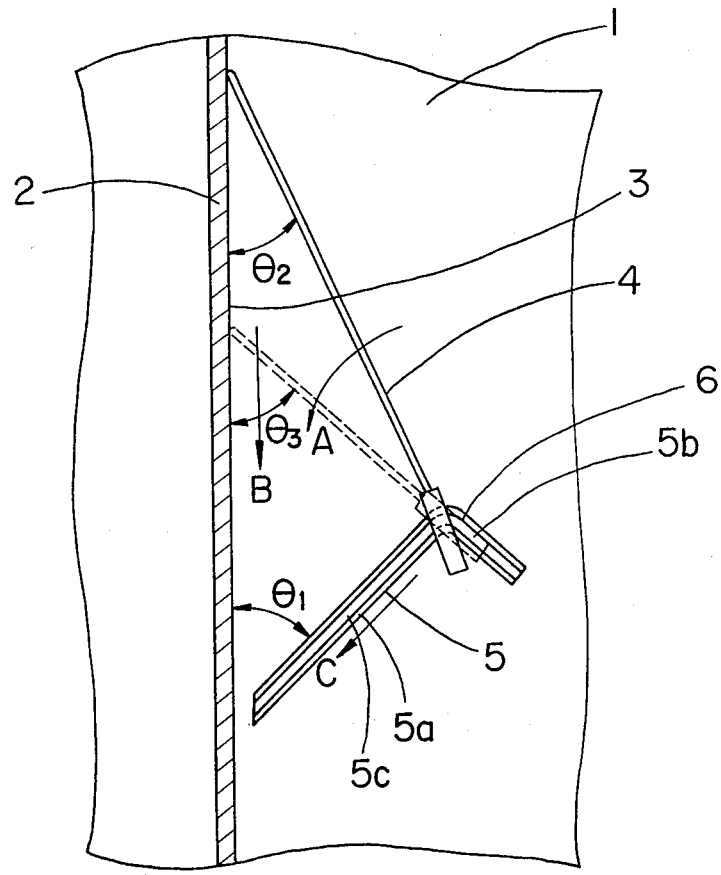
FIG. 3(a) is a plan view explanatory of the principle of vertical down welding by this invention process.
Figure 3B:
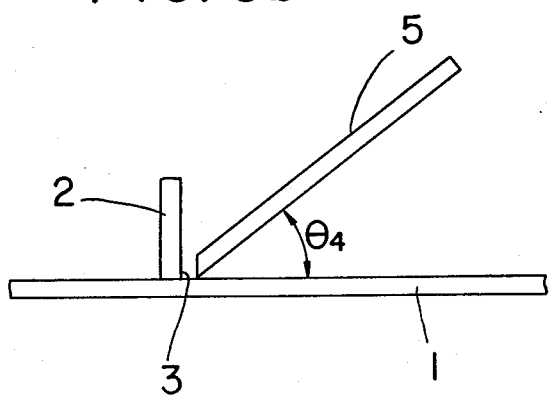
FIG. 3(b) is its side view.

That is to say, as shown in FIG. 3(i a), the slide bar 5 is inclined upwardly at the angle $\theta_1$ and a welding rod holder 6 is engaged with the guide rail 5a, along which it moves down by its counterweight. The inclination angle $\theta_1$ can be selected as desired, so long as it permits the tip of the welding rod 4 supported by the welding rod holder 6 to move down along the weld line 3 while being molten, but the inclination angle $\theta_1$ is selected in the range of 40° to 60° and the slide bar is inclined at an angle $\theta_4$ of 40° to 60° to the member 1 to be welded. With the inclination angle $\theta_1$ exceeding 60°, the welding holder 6 does not easily move down in a direction C indicated by an arrow, whereas with the inclination angle $\theta_1$ smaller than 40°, the manipulation-of-electrode ratio increases, resulting in lowered workability.

Figure 5:
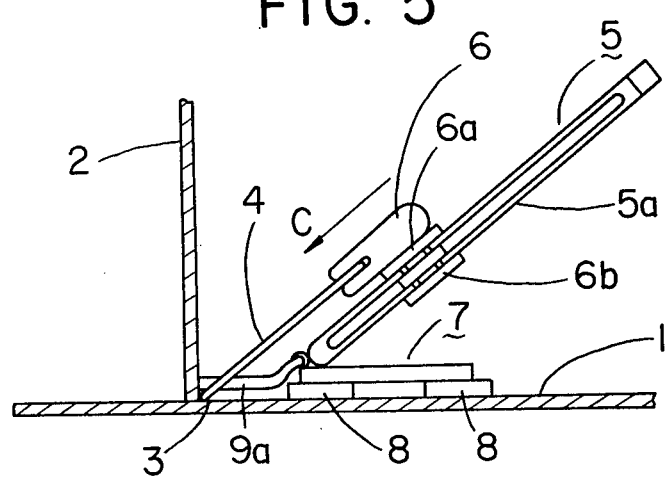
FIG. 5 is a side view from the direction C'—C' indicated by arrows in FIG. 4.

When engaging the welding rod holder 6 with the guide rail 5a, it is sufficient if the welding rod holder 6 is engaged with the guide rail 5a, for instance, through washers 6a and 6b in a manner to be slidable along the guide rail. (See FIG. 5). The guide rail 5a comprises a sub-rail 5b and a main rail 5c as shown in FIG. 2. On the sub-rail 5b the welding rod 4 supported by the welding rod holder 6 is rotated in a direction A until the angle between the welding rod and the weld line changes from $\theta_2$ to $\theta_3$ in FIG. 3(a). Thereafter, the welding rod holder 6 is lowered along the main rail 5c while maintaining the angle between the welding rod and the weld line constant.

In the case of performing the welding operation in the vertical direction by moving down the welding rod 4 along the weld line 3 as mentioned above, it is necessary that the guide rail 5a be formed to have a predetermined length corresponding to the length of the weld line 3. In the vertical position, however, the guide rail 5a or the slide bar 5 is inclined upwardly relative to the vertical member 1 to be welded unlike in the case of horizontal fillet welding and it is required that a support mechanism or support base therefor possess sufficient mechanical strength, and be small in size. The reason is that if the support base is bulky, then welding is impossible in a narrow space, losing the the portability of the welding machine and impairing the working efficiency.

Then, the lower end of the slide bar 5 carrying the guide rail 5a is supported by a support base 7, which is constituted in a triangular or like form. That is to say, the lower end of the slide bar 5 is supported by the support base 7 at one of its vertexes, i.e. a vertex 7a formed by the intersection of two sides except the lower side, or in the vicinity of the vertex, and holding members 8 are attached to the back of the support base at the other two vertexes 7b and 7c, respectively.

In more detail, the welding rod holder 6 is lowered along the guide rail 5a on the slide bar 5 and the tip of the welding rod 4 is molten for welding. In this case, the welding rod holder 6 has to be held on the slide bar 5 securely and stably and when the welding rod holder 6 lies at its upper end, the slide bar 5 is subject to a maximum load.

Accordingly, it is preferable that the slide bar 5 be supported at the upper end as well as the lower end but this makes the support mechanism bulky. In this respect, the present inventor's studies have revealed that a triangular or like member is effective as the support base 7, that in the case of the triangular support base 7, the slide bar 5 can be supported stably at its lower end alone, and that it is sufficient that the magnetic hold members 8 are attached to the two vertexes 7b and 7b of the support base 7.

Figure 6A:
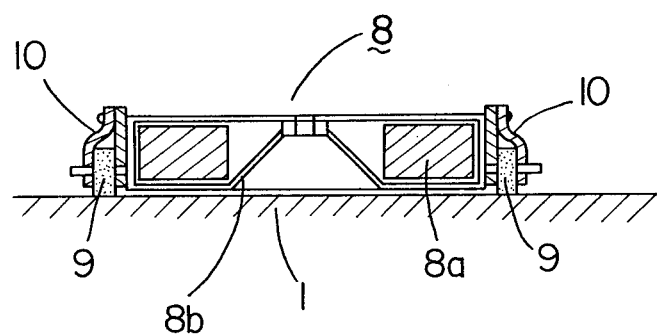
FIGS. 6(a) and (b) are a front and a side view of an example of a support base loading and unloading mechanism.

It is sufficient that each hold member 8 is constituted by a ring-shaped magnet 8 and a case therefor as depicted in FIG. 6(a).

With the hold members 8 mounted on the support base 7 only at the two vertexes 7b and 7c, the support base can easily be removed from the member to be welded.

Figure 6B:
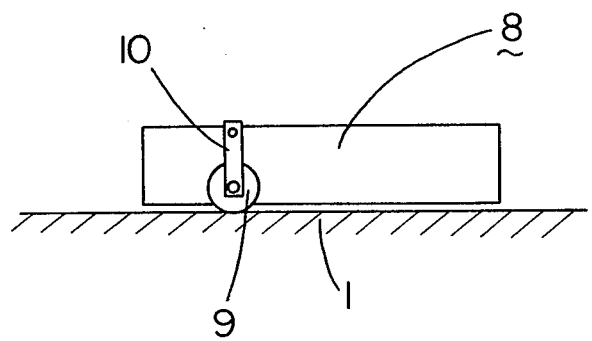

Furthermore, rollers 9 can be rotatably mounted as loading and unloading means on both sides of each hold member 8 as shown in FIGS. 6(a) and 6(b). That is to say, the rollers 9 are each rotatably mounted on one side of each hold member 8 at a supporting point 10a through a bracket 10. Accordingly, when installing the hold member 8, the magnet 8 or its case 8b is contacted with the surface of the member 1 to be welded and, when removing the hold member, the bracket 10 is turned to cause the hold member 8 or its case 8b to get out of contact with the surface of the member 1.

Figure 4:
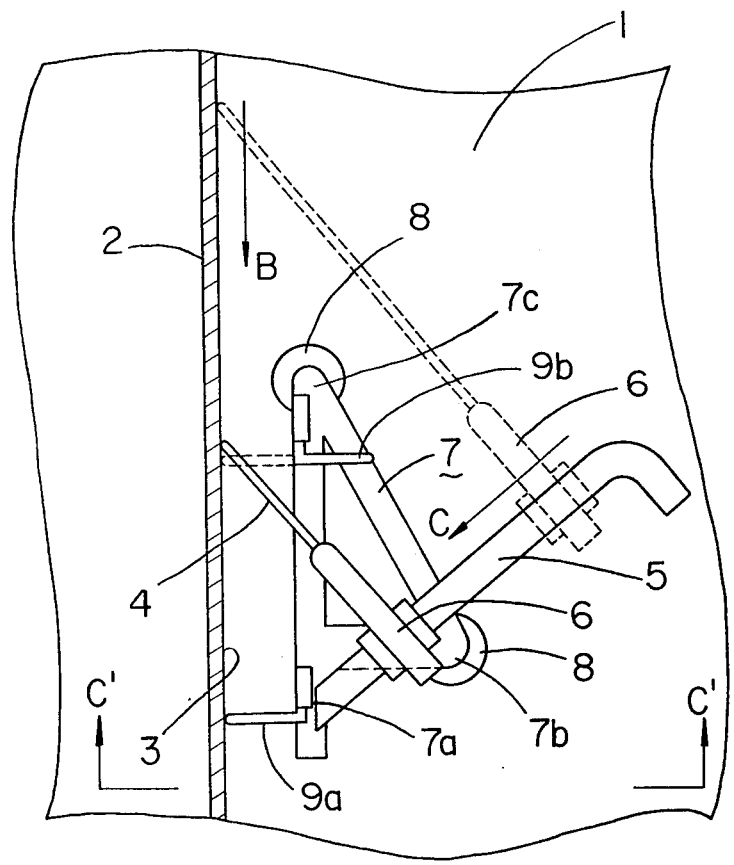
FIG. 4 is a front view showing, by way of example, a support base and a positioning device.

Besides, at least two positioning rods 9a and 9b are provided which extend from that marginal edge of the support base 7 of the abovesaid structure which is opposite to the welding line 3, and at least one of them, 9b, is formed to be foldable. With such a positioning mechanism, the welding rod can be easily set at a proper position in relation to the weld line 3 at all times and these positioning rods 9a and 9b do not constitute an obstacle to the welding operation. That is to say, if the positioning rods 9a and 9b are formed to extend from the opposite sides of the support base 7, then they project out into the downward bath of the welding rod 4. With the positioning rods 9a and 9b being foldable, however, they would not hinder the downward movement of the welding rod 4 if held in such a folded position as the welding rod is lowered, as shown in FIG. 4.

It is preferable to cover the top surface of the guide rail 5a of the abovesaid structure or the slide bar 5 with a protective cover 12. The reason is that the guide rail 5a and the slide bar 5 are protected by the protective cover 12 from spattering during welding, ensuring smooth sliding movement of the welding rod holder 6.

Next, a description will be given, with reference to FIG. 3(a), of the welding operation through the use of the welding machine of the abovementioned arrangement.

At first, the welding rod holder 6 is set on the sub-rail 5b connected to the upper end of the guide rail 5a or on the main rail 5c at the upper end thereof, with the starting angle $\theta_2$ between the welding rod 4 and the weld line 3 being held larger than 20°, and the welding rod holder 6 is lowered along the sub-rail 5b or rotated at the upper end of the main rail 5c, starting the welding operation. Thereafter, during the downward movement along the sub-rail 5b on the slide bar 5 or at the upper end of the main rail 5c, the welding rod holder 6 is pushed by a cylinder 11 to be rotated, resulting in the angle $\theta_3$ between the welding rod 4 and the weld line 3 gradually becoming larger than the starting angle exceeding 20°. Accordingly, at the start of the welding, the starting angle exceeds 20° and this is larger than in the conventional inclination welding with electrode set of lower angle and so forth, so that the root portion is penetrated by sufficient arcing to form beads for excellent shapes and the arc length is also appropriate, minimizing the spattering.

Then, the welding rod holder 6, after rotation, moves down along the main rail 5c on the condition that the angle between the welding rod 4 and the weld line 3 is equal to the predetermined angle $\theta_1$ (35° to 80° C.) and remains unchanged. During this downward movement, the tip of the welding rod 4 moves down in a direction B indicated by an arrow. The angle $\theta_3$ is held larger than 35° but when it is smaller than 35°, the region in which the angle $\theta_2$ varies to $\theta_3$ is narrow and, consequently, the slide bar carrying the guide rail cannot be made short, obstructing the miniaturization of the welding machine. When the angle $\theta_3$ exceeds 80°, slags fall in drops ahead of the tip of the welding rod during its downward movement, making the welding operation impossible.

POSSIBILITIES OF INDUSTRIAL APPLICATIONS

As has been described in detail in the foregoing, this invention process is suitable for vertical down welding in the fields of shipbuilding, building and so forth, and the process is the gravity arc welding process and hence does not ever require any motive power. Furthermore, the process can be automated, the range of occurrence of spattering can be minimized, the manipulation-of-electrode ratio can be held constant and excellent weld beads can be obtained.

In addition, according to the welding machine of the present invention, the lower end of the slide bar carrying the upwardly inclined guide rail is supported by a triangular or like support base alone, so that the welding machine is small and lightweight. In addition, since a plurality of positioning rods are formed to extend from the support base towards the weld line, the welding machine can easily be set, and hence it is excellent in portability and applicable, without hindrance, to vertical down welding in a narrow space.

We claim:

1. A downward welding process wherein a welding rod holder supporting a welding rod is allowed to lower by gravity along a guide rail comprising an upper sub-rail and a lower main rail extending from the lower end of said sub-rail, said guide rail disposed upwardly slanted with respect to a vertical weld line with the tip of said welding rod being melted as it proceeds downwards along said vertical weld line to effect welding for a length of the weld line corresponding to a predetermined length of said welding rod, comprising the steps of;

setting said welding rod in said welding rod holder such that the initial angel between said welding rod and vertical weld line is at least 20°;

allowing said welding rod holder to move with said welding rod along said sub-rail so that the angle between said welding rod and vertical weld line is continuously increased from said initial angle up to an angle in a range between 35° and 80°, thereby effecting welding of a portion of a given length of said vertical weld line with the progressive melting of the tip of said welding rod until said welding rod holder reaches the top of said main rail; and subsequently continually moving said welding rod holder to the lower end of said main rail while maintaining said angle in said range of between 35° and 80° between said welding rod and vertical weld line, thereby effecting welding of the rest of the given length of said vertical weld line with the progressive melting of said welding rod.

2. A downward welding machine comprising:

a guide rail comprising; a main rail and a sub-rail and disposed upwardly slanted with respect to a vertical weld line;

said sub-rail terminating at its lower end with the upper end of said main rail and being adapted such that the angle between a welding rod and a vertical weld line is continuously increased from an initial angle of at least 20° up to an angle in a range between 35° and 80° with a descent of a welding rod holder supporting said welding rod along said sub-rail from the upper end to the lower end thereof;

said main rail extending from the lower end of said sub-rail being straight so that said angle between 35° and 80° between said welding rod and vertical weld line is maintained while said welding rod holder is lowered along said main rail from the upper end to the lower end thereof;

said welding rod holder capable of lowering gravity along said guide rail, said welding rod being securedly set in said welding rod holder so that it cannot be rotated with respect thereto; and a support base having a triangular or like shape, the lower end of said guide rail being supported on said support base at or in the vicinity of the intersection of two sides thereof other than the largest side, said support base having magnetic holder members attached to its back at the other two intersection points than said guide rail support point and also at least two positioning rods extending from its edge facing said vertical weld line, one end of each said positioning rod being rotatable with respect to said support base.

* * * * *